United States Patent
Ro

[11] Patent Number: 5,999,690
[45] Date of Patent: *Dec. 7, 1999

[54] PICTURE SIGNAL RECORD/PLAYBACK APPARATUS AND METHOD THEREOF FOR TIME LAPSE VCR

[75] Inventor: Se Yong Ro, Kyungki-Do, Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/795,245

[22] Filed: Feb. 10, 1997

[30] Foreign Application Priority Data

Feb. 12, 1996 [KR] Rep. of Korea ........................ 96-3334

[51] Int. Cl.⁶ ................ H04N 5/91; H04N 7/00
[52] U.S. Cl. ............................. 386/46; 386/124; 360/5; 348/715
[58] Field of Search ................ 386/1, 5, 38, 46, 386/110, 117, 111, 90–91, 124; 360/5; 369/60; 348/159, 143, 715; H04N 5/82, 5/76, 5/91, 7/00

[56] References Cited

U.S. PATENT DOCUMENTS

| | | | |
|---|---|---|---|
| 4,001,881 | 1/1977 | Folsom | 360/5 |
| 4,198,656 | 4/1980 | Mathisen | 358/127 |
| 4,396,961 | 8/1983 | Prasad et al. | 360/78 |
| 4,607,294 | 8/1986 | Nishitani et al. | 360/35.1 |
| 4,630,110 | 12/1986 | Cotton et al. | 358/108 |
| 4,633,335 | 12/1986 | Yamamoto et al. | 360/35.1 |
| 4,796,104 | 1/1989 | Ito et al. | 360/10.3 |
| 4,819,097 | 4/1989 | Azuma et al. | 360/35.1 |
| 4,994,916 | 2/1991 | Pshtissky et al. | 358/181 |
| 5,257,142 | 10/1993 | Hong | 360/33.1 |
| 5,363,264 | 11/1994 | Cavanaugh et al. | 360/11.1 |
| 5,402,167 | 3/1995 | Einbinder | 348/152 |
| 5,432,769 | 7/1995 | Honjo | 369/60 |
| 5,475,539 | 12/1995 | Orii | 360/35.1 |
| 5,526,133 | 6/1996 | Paff | 358/335 |
| 5,539,528 | 7/1996 | Tawa | 358/335 |
| 5,615,017 | 3/1997 | Choi | 386/109 |
| 5,619,385 | 4/1997 | Kawakami et al. | 360/64 |
| 5,619,732 | 4/1997 | Yoneyama | 395/878 |
| 5,625,410 | 4/1997 | Washino et al. | 348/154 |
| 5,625,504 | 4/1997 | Okada et al. | 360/27 |
| 5,625,741 | 4/1997 | Nakazato | 386/120 |

*Primary Examiner*—Wendy Garber
*Assistant Examiner*—Vincent F. Boccio
*Attorney, Agent, or Firm*—Finnegan, Henderson, Farabow, Garrett & Dunner, L.L.P.

[57] ABSTRACT

A picture signal record/playback apparatus and method thereof for a time lapse VCR which makes it possible to operate with enhanced stability and greater accuracy in providing picture signals. The apparatus includes a memory unit for storing therein by a per frame unit a plurality of frame picture signals respectively having an inter-frame input time interval, a memory control unit for consecutively reading the picture signals for the plurality of frames from the memory unit so as not to have a time interval therebetween, and a recording unit for recording on a magnetic tape media the plurality of frame picture signals being consecutively read.

4 Claims, 7 Drawing Sheets

PICTURE SIGNAL RECORD/PLAYBACK APPARATUS AND METHOD THEREOF FOR TIME LAPSE VCR

BACKGROUND OF THE INVENTION

1. Field of the Invention

The present invention relates to a time lapse videocassette tape recorder (VCR) used for security and/or surveillance, and more particularly to an improved picture signal record/playback apparatus and method thereof for a time lapse VCR which makes it possible to operate with an enhanced stability and greater accuracy in providing picture signals.

2. Description of the Prior Art

In general, a time lapse VCR is adopted in sites such as banks, museums and the like to prevent undesirable trespassing.

Here, a time lapse VCR plays a watchdog role while recording or playing-back, and in case there are installed several video cameras, there accordingly should be provided as many time lapse VCRs, so that an input picture signal can be converted and recorded in a VCR via a buffer memory in the VCR.

A time lapse VCR used for a watchdog and observation purpose over a long time base does not record all the frames during a real running time period of a picture signal, and instead selects a certain interval among real running time periods and records corresponding frames one by one, whereby stationary pictures can be repeatedly recorded at a certain time intervals while running a tape at a constant rate.

Figure 1:
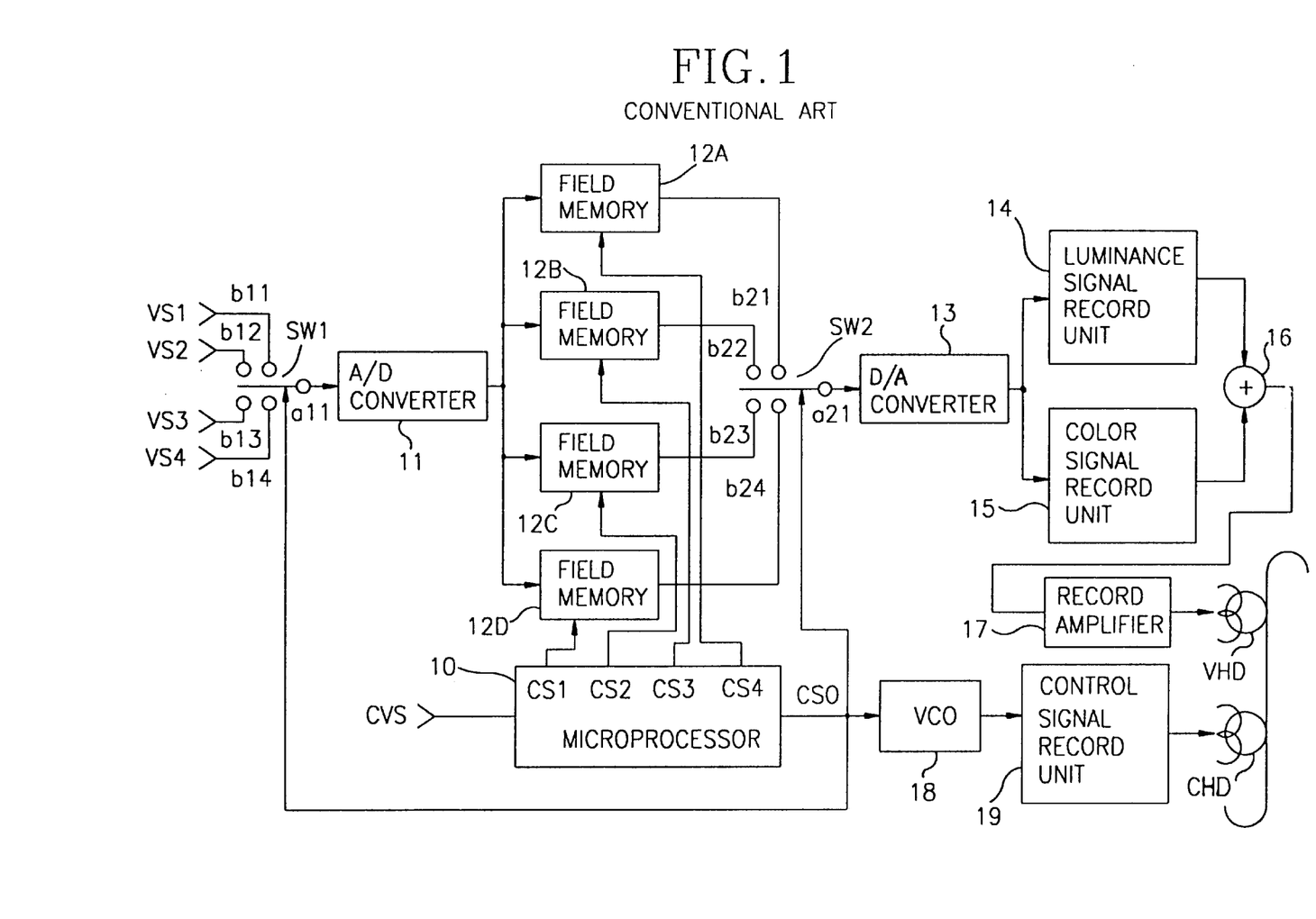
FIG. 1 is a schematic block diagram showing a conventional multi-picture signal recording apparatus.

As shown in FIG. 1, a conventional multi-picture signal recording apparatus includes: a microprocessor 10 for carrying out a general control in accordance with a time-sharing signal CVS; a switch SW1 for selecting input picture signals VS1–VS4 in accordance with a control signal CS0 from microprocessor 10; an A/D converter 11 for converting a picture signal selected by switch SW1 into a digital signal; four field memories 12A–12D for respectively storing therein a corresponding output value of A/D converter 11 in accordance with control signals CS1–CS4 outputted from microprocessor 10; a switch SW2 for selecting output values of the four field memories 12A–12D in accordance with control signal CS0 from microprocessor 10; a D/A converter 13 for converting an output value selected by switch SW2 into an analog signal; a luminance signal record processing unit 14 and a color signal record processing unit 15 for respectively separating and recording a luminance signal and a color signal from the analog picture signal outputted from the D/A converter 13; an adder 16 for adding output signals of luminance signal record processing unit 14 and color signal record processing unit 15; a record amplifier 17 for amplifying and applying to a video head VHD a picture signal outputted from the adder 16; a voltage controlled oscillator (VCO) 18 for oscillating a frequency in accordance with control signal CS0 outputted from microprocessor 10; and a control signal record processing unit 19 for processing and applying to a control head CDH an output signal of VCO 18.

The operation of the thusly constituted conventional multi-picture signal recording apparatus will now be described with reference to the accompanying drawings.

Figure 2A:
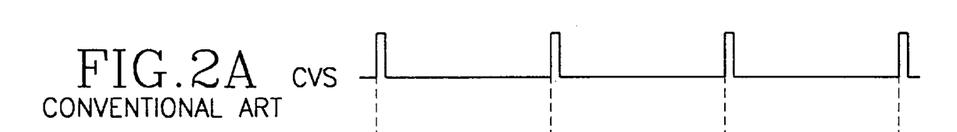
FIGS. 2A through 2F are timing diagrams of respective signals in the apparatus of FIG. 1.
Figure 2B:
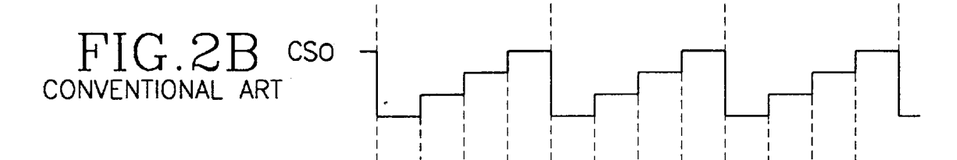
Figure 2C:
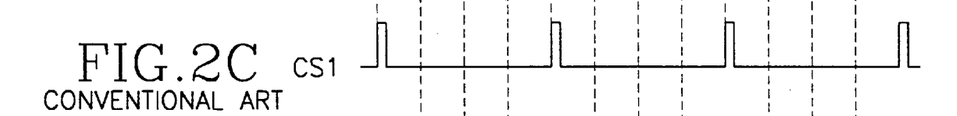
Figure 2D:
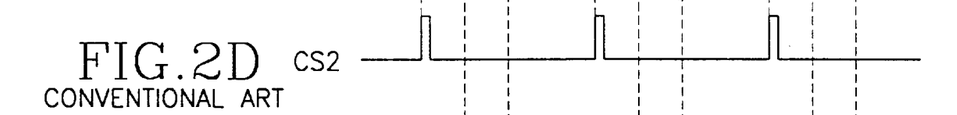
Figure 2E:
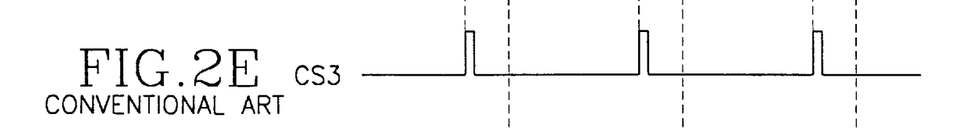
Figure 2F:
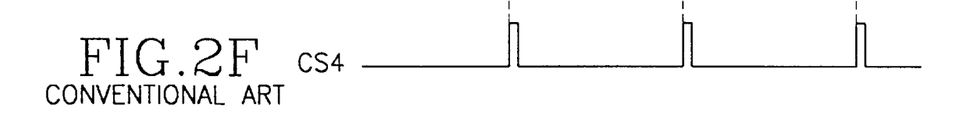

First, as shown in FIGS. 2A–2F, when time-sharing signal CVS is applied, the microprocessor 10 outputs control signal CS0 as shown in FIG. 2B, and control signals CS1–CS4 as shown in FIGS. 2C–2F.

The switch SW1 connects an operating terminal a11 sequentially to fixed terminals b11–b14 in accordance with the control signal CS0 and outputs picture signals VS1–VS4. The selected picture signals are converted to digital signals in A/D converter 11 and applied sequentially to the four field memories 12A–12D which sequentially store therein the applied digitized field picture signals VS1–VS4 in accordance with control signals CS1–CS4, and the switch SW2 connects an operating terminal a21 sequentially to the fixed terminals b21–b24 in accordance with control signal CS0, whereby the picture signals VS1–VS4 outputted from the field memories 12A–12D are sequentially converted to analog signals in D/A converter 13.

As a result, analog picture signals outputted from the D/A converter 12 are separated into luminance signals and color signals via the luminance record processing unit 14 and the color record processing unit 15 and added in the adder 16. The added picture signals are amplified in the record amplifier 17, applied to video head VHD, and recorded on the video tape.

The VCO 18 outputs a separation control signal in accordance with control signal CS0 outputted from microcomputer 10. The control signal record processing unit 19 processes and applies the separation control signal to control head CDH thus to be recorded on the video tape.

Figure 3:
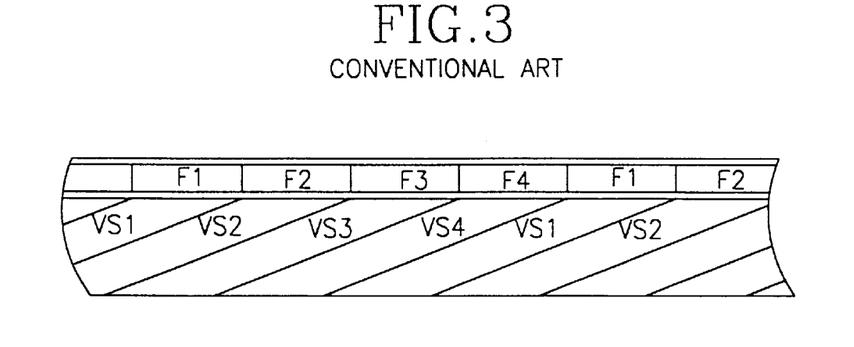
FIG. 3 is a view showing a picture signal and a separation control signal recorded on a video tape.

As shown in FIG. 3, picture signals VS1–VS4 are sequentially and circulatedly recorded on slant tracks of the video tape, and separate control signals F1–F4 are synchronized in accordance with picture signals VS1–VS4 and recorded on a linear track on a lower portion of a video tape.

Namely, the multi-picture signal recording apparatus selects a certain interval during real time in accordance with time-sharing signal CVS and records a picture signal frame by frame.

Figure 4:
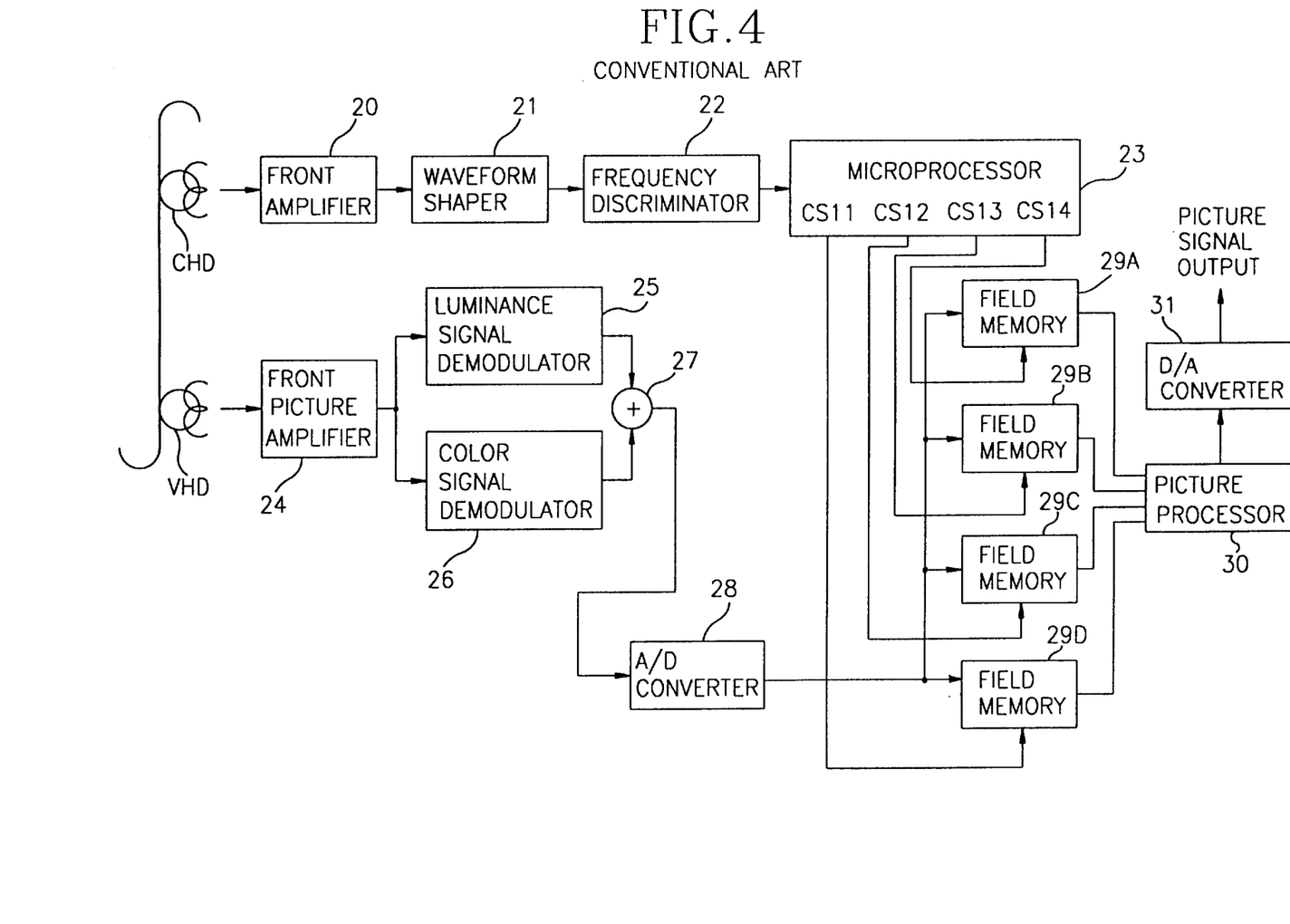
FIG. 4 is a schematic block diagram showing a conventional multi-picture signal playback apparatus.

As shown in FIG. 4, a conventional multi-picture signal playback apparatus includes: a pre-amplifier 20 for amplifying separation control signals F1–F4 played back from a video tape by a control head CDH; a waveform shaper 21 for shaping a pulse wave outputted from the pre-amplifier 20 into a sine wave; a frequency discriminator 22 for discriminating a frequency of an output signal of the waveform shaper 20; a microprocessor 23 for outputting control signals CS11–CS14 in accordance with a discrimination signal from the frequency discriminator 22; a picture signal pre-amplifier 24 for amplifying multi-picture signals VS1–VS4 played back from the video tape by video head VHD; a luminance signal demodulator 25 and a color signal demodulator 26 for respectively demodulating a luminance signal and a color signal amplified in the picture signal pre-amplifier 24; an adder 27 for adding the luminance signal and the color signal demodulated by the luminance signal demodulator 25 and the color signal demodulator 26, respectively; an A/D converter 28 for converting an output signal of adder 27 into a digital signal; four field memories 29A–29D for storing a digital picture signal outputted from the A/D converter 28 in accordance with control signals CS11–CS14 outputted from microprocessor 23; a picture signal processing unit 30 for processing picture signals outputted from the four field memories 29A–29D to thereby appear on the same picture; and a D/A converter 31 for converting a digital picture signal outputted from the picture signal processing unit 30 into an analog signal.

The operation of the thusly constituted conventional multi-picture signal playback apparatus will now be described with reference to the accompanying drawings.

First, separation control signals F1–F4 played back by control head CDH from a linear track of the video tape are amplified in the pre-amplifier 20, and demodulated in the waveform shaper 21. The frequency discriminator 22 receives demodulated and control signals F1–F4 and discriminates their frequencies, thereby outputting a discrimination signal indicating the separation of multi-picture signals VS1–VS4.

The picture signals VS1–VS4 played back by video head VDH from slant tracks of the video tape are amplified in the picture signal pre-amplifier 24, and the amplified picture signals are demodulated into a luminance signal and a color signal via luminance signal demodulator 25 and color signal demodulator 26. The demodulated luminance signal and color signal are added in the adder 27 and converted into a digital signal in the A/D converter 28.

As a result, microprocessor 23 controls the operation of field memories 29A–29D in accordance with the discrimination signal outputted from the frequency discriminator 22, and the field memories 29A–29D store therein and output a digital picture signal outputted from the A/D converter 28 in accordance with control signals CS11–CS14, thereby separating the played-back multi-picture signals VS1–VS4.

The multi-picture signals VS1–VS4 outputted from the field memories 29A–29D are added in picture signal processing unit 30 so as to be displayed on the same picture, wherein the picture signal processing unit 30 processes the picture signals by using a PIP (picture in picture) method and outputs the applied multi-picture signals VS1–VS4, whereby a plurality of picture signals can be separately displayed on a single picture.

As described above, the conventional multi-picture signal record/playback apparatus selects a certain interval during real time in accordance with a time-sharing signal CVS and records a picture signal, and the recorded picture signal is played back and displayed in the form of a plurality of picture signals.

However, a tape-recording time has limitation with regard to a multi-picture recording, and when repeating a stop mode recording and a two-track running there are required a variety of controls for frequently and precisely moving an instrumental driving apparatus except for a tape running system and accordingly it is complicated and high priced. Also, in a state in which a tape is loaded for a long time, if a recording and playback operation are repeatedly carried out many times, damage to the VCR or the tape may be incurred thereby.

Further, in case of a VHS tape having a track pitch of 58 m/μm, the design of the mechanism incurs higher cost and lower productivity, and the conventional multi-picture signal record/playback apparatus does not provide a long time recording function and a tape recorded by time lapse recording can not be accurately played back via a general VCR.

SUMMARY OF THE INVENTION

Therefore, it is an object of the present invention to provide a more stable and reliable time lapse VCR picture signal record/playback apparatus and method thereof by solving a structural problem of a time lapse VCR.

To achieve the above-described object, there is provided a time lapse VCR picture signal record/playback apparatus according to the present invention which includes a memory unit for storing therein by a per frame unit a plurality of frame picture signals respectively having an inter-frame input time interval, a memory control unit for reading the picture signals for the plurality of frames from the memory unit so as not to have a time interval therebetween, and a recording unit for recording the plurality of frame picture signals being consecutively read on a magnetic tape media.

Further, a picture signal recording method for a time lapse VCR according to the present invention comprises, in a time lapse mode in which one frame of a picture signal is recorded per second, a first step for storing a picture signal outputted from a picture signal input unit in a buffer for a certain time, a second step for, when the storing is completed, outputting a recording enable signal and setting an instant record time, a third step for recording the picture signal in a VCR during the instant record time set in accordance with the recording enable signal, storing in a buffer a frame data applied thereto during the instant record time, and increasing a count value by a certain level, and a fourth step for sequentially storing in a frame memory the frame data stored in the buffer when the picture signal is completely recorded in the VCR in the instant record time, and repeating the third step.

DETAILED DESCRIPTION OF THE INVENTION

Figure 5:
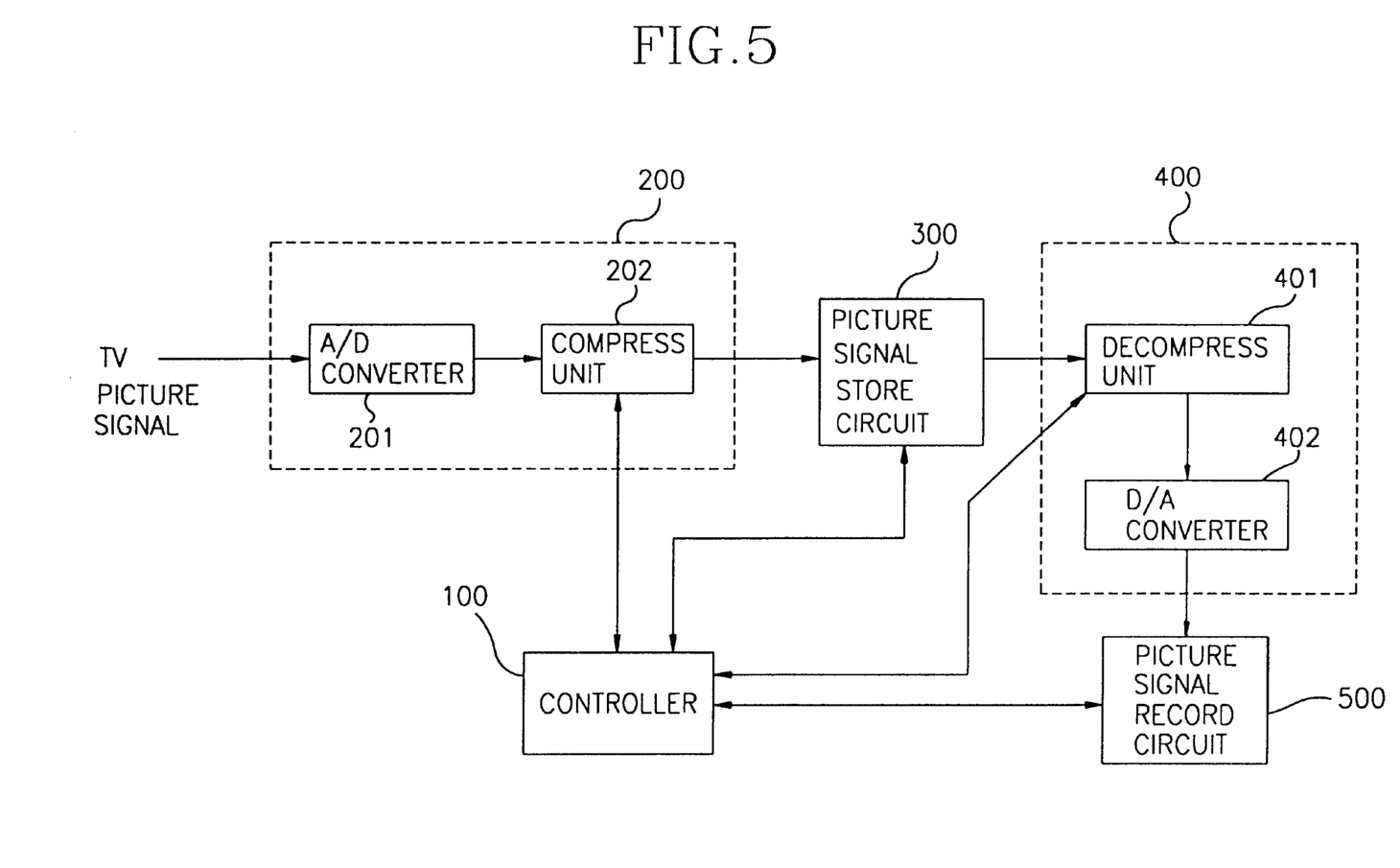
FIG. 5 is a schematic block diagram of a picture signal recording apparatus for a time lapse VCR according to the present invention.

As shown in FIG. 5, a picture signal recording apparatus for a time lapse VCR according to the present invention is provided with: a controller 100 for carrying out an overall control operation; a picture signal input circuit 200 including an A/D converter 201 and a compressor 202 and converting an input TV picture signal into a digital picture signal and compressing it; a picture signal store circuit 300 for storing therein an output value of the picture signal input circuit 200; a picture signal output circuit 400 including a decompress unit 401 and a D/A converter 402 for decompressing an output value of the picture signal store circuit 300 and converting the decompressed value into an analog picture signal; and a picture signal record circuit 500 for recording an output value of the picture signal output circuit 400 on a magnetic record media.

Figure 6:
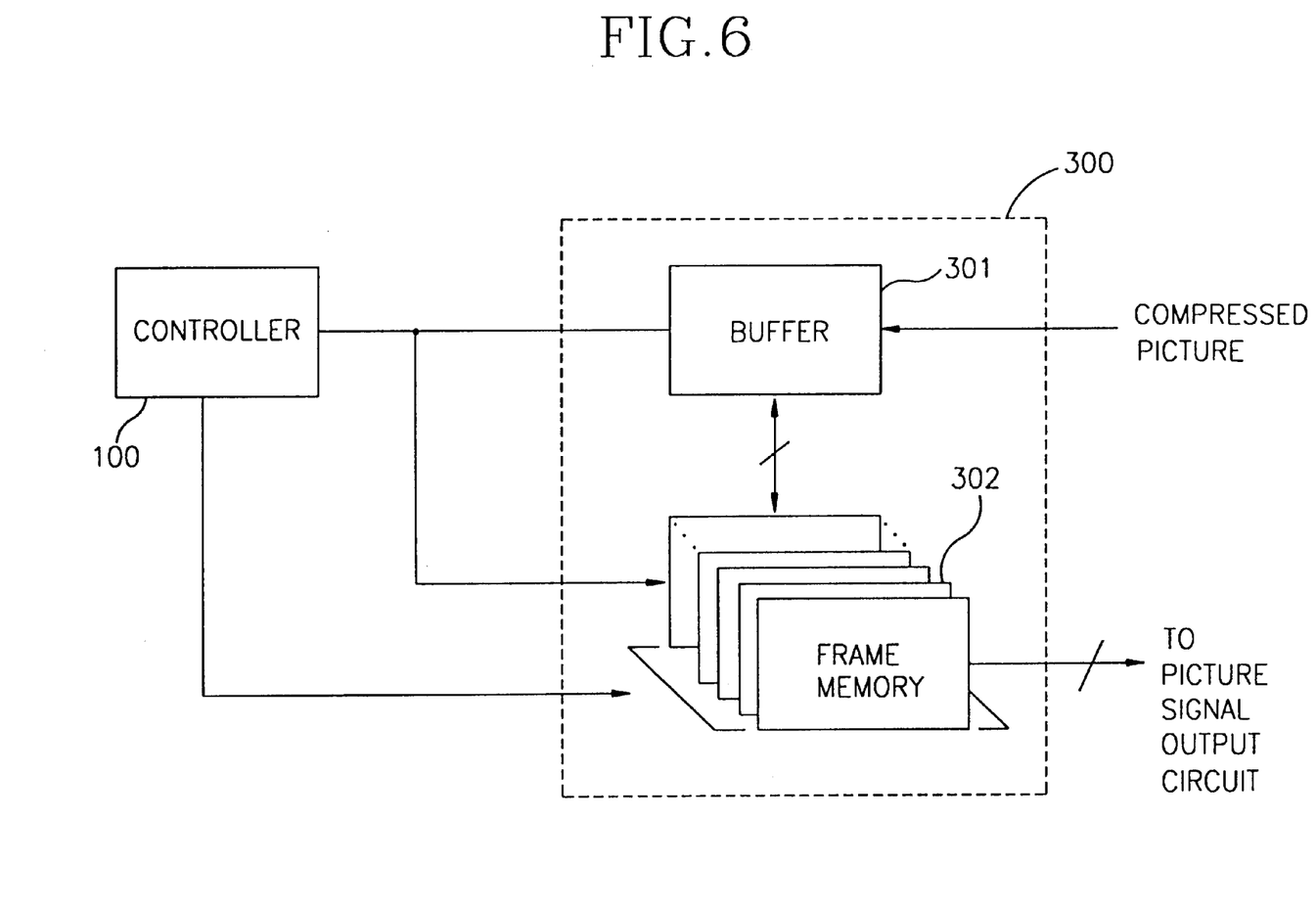
FIG. 6 is a detailed view of a picture signal store unit in FIG. 5.

Referring to FIG. 6, the picture signal store circuit 300 is provided with a buffer 301 for storing therein an output value of the picture signal input circuit 200 and frame memory 302 for storing therein an output value of the buffer 301, respectively in accordance with control of the controller 100.

The operation of the thusly constituted picture signal recording apparatus for a time lapse VCR will now be described.

First, the present invention takes a time lapse mode as an example for recording a picture signal by one frame per second.

The inputted analog TV picture signal is converted into a digital picture signal via A/D converter 201 in the picture signal input circuit 200, and the digital-converted picture signal is outputted through the compress unit 202 in the controller 100 to thereby store the compressed picture signal in picture signal store circuit 300.

When the compressed data outputted from the picture signal input circuit 200 is stored in frame memory 302, the controller 100 outputs a recording enable signal to an address counter (not shown) provided therein, addresses the frame memory 302, and outputs the compressed picture signal to the picture signal output circuit 400.

Here, because the frame memory 302 cannot carry out an input and output operation at the same time, the inputted compressed picture signal inputted thereto during an output operation of the stored compressed picture signal from the input circuit 200 is stored in the buffer 301 as shown in FIG. 6, and when an output operation of the frame memory 302 is completed, the compressed picture signal stored in the buffer 301 is sequentially stored in the frame memory 302.

The decompress unit 401 in the picture signal output circuit 400 decompresses the compressed picture signal outputted from frame memory 302. The decompressed picture signal is converted into an analog picture signal in the D/A converter 402 and outputted. Accordingly, the picture signal record circuit 500 records the analog picture signal outputted from the D/A converter onto a magnetic recording media in accordance with the control of the controller 100.

Figure 7:
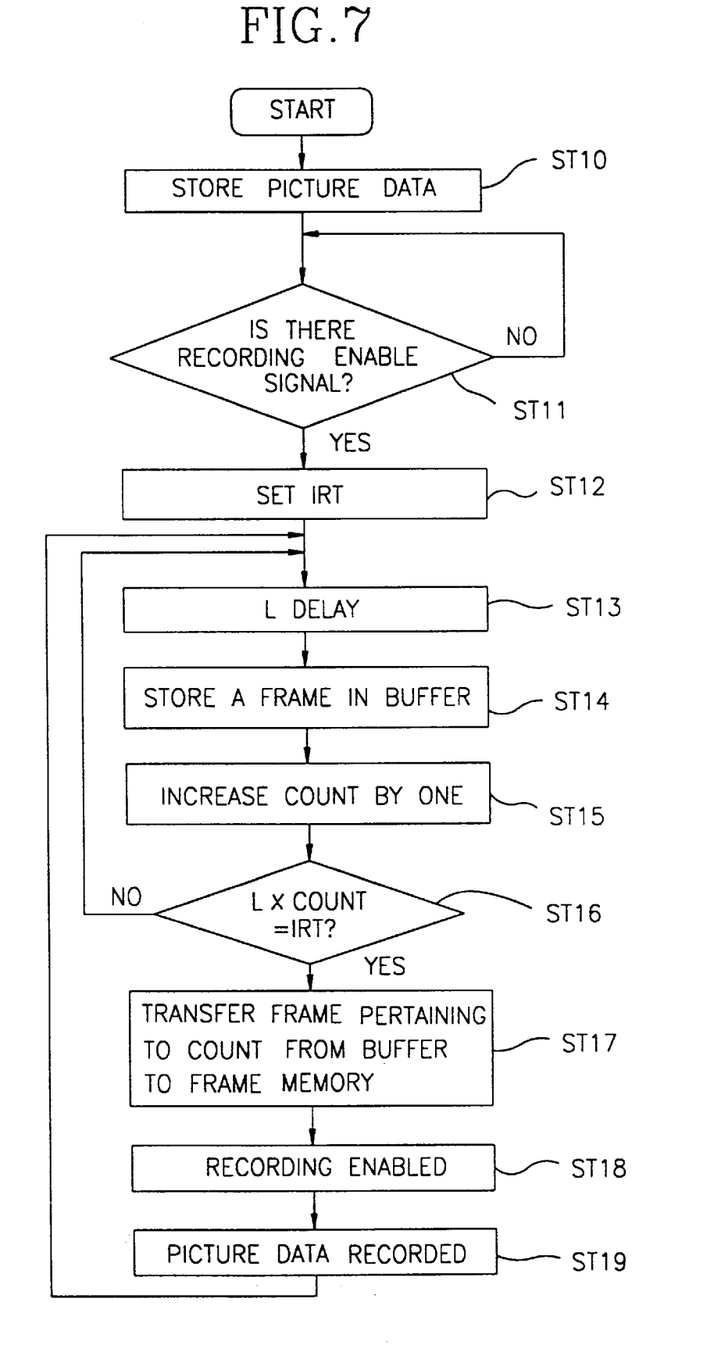
FIG. 7 is a flow chart showing a picture signal recording method for the time lapse VCR in FIG. 5.

With reference to FIGS. 5 through 7, the above-described steps will now be described.

First, the inputted analog TV picture signal is digitized, compressed and applied to picture signal store circuit 300 via picture signal input circuit 200. When the applied picture is stored in frame memory 302 through buffer 301, the controller 100 outputs a recording enable signal to an address counter (not shown) provided therein, counts an address signal in the frame memory 302, and sets an instant record time IRT, for thereby recording the picture signal in a VCR during the instant record time (ST11, 12).

At this time, the instant record time IRT under units per second is obtained by dividing by thirty the entire number of frames being piled in frame memory 302; thirty frames per second are transferred when applying an NTSC method.

That is, assuming that the number of frames stored in the frame memory 302 is 180, because the instant record time IRT is 6 seconds, picture data which has been stored in the frame memory 302 during a real time RT is recorded in the VCR for 6 seconds.

The controller 100 stores in the buffer 301 a one frame data signal outputted from the picture signal input circuit 200 delayed for a time lag L and applied thereto, and increases the count value by one (ST13–15).

Here, the time lag L denotes a time gap between frames, and in the present invention employing a time lapse mode wherein a picture signal for one frame is recorded, the time lag L between frames becomes one second.

Considering an instant record time IRT, the entire number of frames N in the frame memory 302, and the applied inter-frame time lag L, a real running time RT of a picture signal being recorded during the instant record time can be expressed in equation (1) below;

$$RT = N * L \text{ (sec)} \quad (1)$$
$$= (IRT * 30) * L \text{ (sec)}.$$

Therein, the record picture data is proportional to an instant record time of a time lapse VCR. That is, in a record mode in which a time lapse VCR records a frame per second, the worth of picture data signals are put together, the number of the total frames stored in the frame memory 302 becomes 180.

In accordance with equation (1), an instant record time IRT becomes 6 seconds, and the real picture signal running time RT is obtained as 180* one second, so that a picture signal serves to compress in the picture signal store circuit 200 a series of picture signals lasting for 6 seconds out of the real running time of three minutes, and the compressed data signals are recorded in a time lapse VCR.

The controller 100 compares (ST16) the result of the delay time (L=1)×the count value with the instant record time (IRT=6 seconds). If the result of the delay time (L=1)× the count value is less than that of instant record time (IRT=6 seconds) the above steps (ST13–ST15) are repeated (ST15) for 6 seconds during which the picture data signals are recorded in a VCR, and if the result of delay time (L=1)×the count value is more than that of the instant record time (IRT=6 seconds), a frame data value serving as a count value becomes stored (ST17) in the frame memory 302 from the buffer 301.

Namely, that the result of the delay time (L=1)×the count value is more than that of the instant record time (IRT=6 seconds) means that the picture data signal is completely recorded in the VCR and again picture data is stored in the frame memory 302. Thereafter, when all the picture data signals are filled up in the frame memory 302, the controller 100 outputs a recording enable signal and counts the address value in the frame memory 302, thereby repeating (ST18, ST19) the operation for recording the picture signal in the VCR for the instant record time (IRT=6 seconds).

Figure 8:
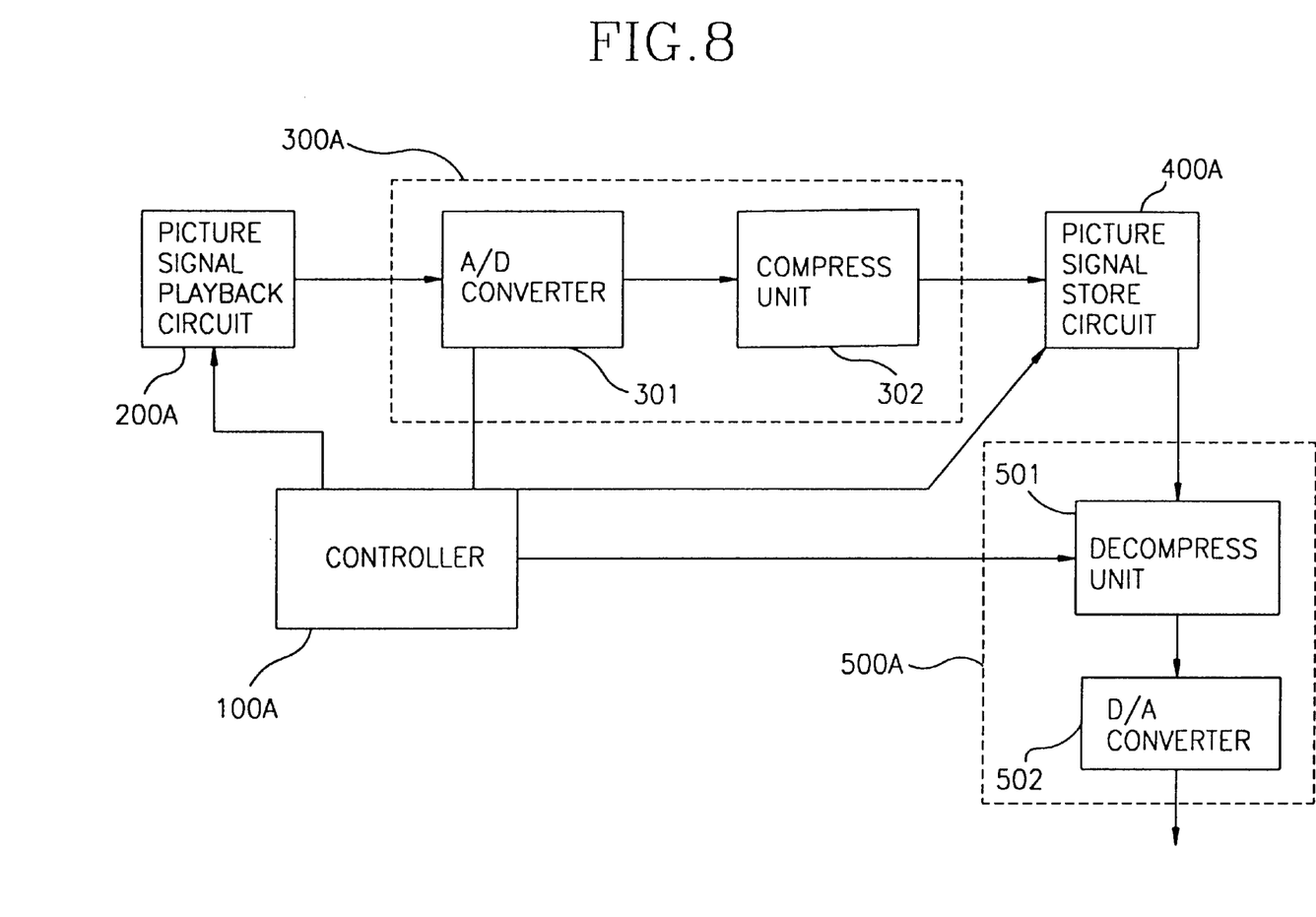
FIG. 8 is a schematic block diagram of a picture signal playback apparatus for a time lapse VCR according to the present invention.

As shown in FIG. 8, a picture signal playback apparatus for a time lapse VCR is provided with: a controller 100A for carrying out an overall control operation; a picture signal playback circuit 200A for playing-back a picture signal from a magnetic recording media in accordance with control of the controller 100A; a picture signal input circuit 300A including an A/D converter 301 and a compressor 302, and for converting an input picture signal to a digital picture signal and compressing the converted signal in accordance with control of the controller 100; a picture signal store circuit 400A for storing therein the picture signal outputted from the picture signal input circuit 300A; and a picture signal output circuit 500A including a decompress unit 501 and a D/A converter 502 and for decompressing an output value of the picture signal store circuit 400A and converting it into an analog picture signal in accordance with control of the controller 100.

The operation of the thusly constituted picture signal playback apparatus for a time lapse VCR according to the present invention will now be described.

When a playback mode is set, the picture signal playback circuit 200A plays back a picture signal recorded on a magnetic recording media in accordance with control of the controller 100A and the picture signal input circuit 300A receives an output value of the picture signal playback circuit 300A, converts it into a digital and compresses the digital signal using the A/D converter 301 and the compressor 302.

Next, the picture signal store circuit 400A stores therein for a certain time the compressed data outputted from the picture signal input circuit 300A in accordance with control of the controller 100A, and the picture signal output circuit 500A decompresses an output value of the picture signal store circuit 400A using the decompress unit 501, and in the D/A converter 502 converts the decompressed value into an analog TV signal and outputs the result, whereby the converted analog TV signals are sequentially played back on a TV screen.

As described above, the present invention stores a certain amount of picture data in a simple memory and then consecutively in a VCR, instead of employing a mechanism in which a stop and a running operation are repeated, thereby providing a more stable record and playback apparatus while improving an efficiency of a time lapse VCR with a simplified composition at less cost.

Further, the present invention records a certain amount of picture data for a certain time without repeating a stop and a play operation so that noise which conventionally occurs due to a difference between track angles in a playback mode and a play mode can be eliminated, thereby providing a picture with a greater accuracy.

What is claimed is:

1. A picture signal recording apparatus for a time lapse videocassette tape recorder comprising:

a picture signal input circuit for receiving digital frame picture signals;

a memory unit for storing said digital frame picture signals, said digital frame picture signals having an inter-frame input time interval and being consecutively outputted from said picture signal input circuit;

a controller unit for outputting a control signal to read the digital frame picture signals stored in said memory unit when the storing of the digital frame picture signals in said memory unit is completed, the controller unit having an address counter;

a picture signal output circuit for outputting said digital frame picture signals as analog picture signals; and a recording unit for recording said analog picture signals on a magnetic tape media, said analog picture signals being consecutively outputted from said picture signal output circuit, wherein the memory unit includes a buffer unit for storing therein an output value of the picture signal input circuit while the analog picture signals are being stored in the recording unit during an instant record time, and a frame memory unit for receiving an output value of the buffer unit and sequentially providing the picture signal output circuit with the received output value of the buffer unit during the instant record time, in accordance with the controller unit.

2. A picture signal playback apparatus for a time lapse videocassette tape recorder comprising:

a picture signal playback circuit for playing back picture signals recorded on a magnetic recording media;

a picture signal input circuit for receiving digital frame picture signals;

a frame memory unit for storing the digital frame picture signals being consecutively outputted from the picture signal input circuit;

a buffer memory unit for storing said digital frame picture signals from the picture signal input circuit when the storing of the digital frame picture signals in the frame memory unit is completed;

a controller unit for outputting a control signal to read the digital frame picture signals stored in said frame memory unit, the controller unit having an address counter; and a picture signal output circuit for outputting the digital frame picture signals as analog picture signals, and repeatedly outputting the analog picture signals to a display device, wherein the buffer unit stores therein an output value of the picture signal input circuit while the analog picture signals are being outputted from the picture signal output circuit during an instant record time, and the frame memory unit receives an output value of the buffer unit and sequentially provides the picture signal output circuit with the received output value of the buffer unit during the instant record time, in accordance with the controller unit.

3. A picture signal recording method for a time lapse video cassette tape recorder having a memory for buffering a picture signal, comprising:

storing a picture signal outputted from a picture signal input circuit in a frame memory unit sequentially;

outputting a recording enable signal and setting an instant recording time when said picture signal storing is completed;

recording the picture signal from the frame memory unit onto a magnetic tape media during the instant recording time set in accordance with the recording enable signal, storing frame data applied thereto in a buffer memory unit during the instant recording time, and increasing a count value to a certain level, and sequentially transferring the frame data stored in the buffer memory unit to the frame memory unit when the picture signal is completely recorded in the instant recording time, and repeating said recording the picture signal, storing the frame data and increasing the count value step.

4. The method of claim 3, wherein said recording the picture signal, storing the frame data and increasing the count value step comprises comparing a delay time (L=1)×a count value with the instant recording time;

storing the applied frame data in the buffer memory unit and increasing the count value if a result of the delay time (L=1)×the count value is less than that of the instant recording time when the frame data is being recorded; and storing in the frame memory unit a frame data corresponding to the count value if the result of the delay time (L=1)×the count value is greater than that of the instant recording time.

* * * * *